US012590874B2

(12) United States Patent
Matsuura

(10) Patent No.: US 12,590,874 B2
(45) Date of Patent: Mar. 31, 2026

(54) TENSILE TESTING MACHINE AND METHOD FOR CONTROLLING TENSILE TESTING MACHINE

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 403 days.

(21) Appl. No.: 17/633,959

(22) PCT Filed: Jan. 9, 2020

(86) PCT No.: PCT/JP2020/000483
§ 371 (c)(1),
(2) Date: Feb. 9, 2022

(87) PCT Pub. No.: WO2021/049049
PCT Pub. Date: Mar. 18, 2021

(65) Prior Publication Data
US 2022/0291102 A1 Sep. 15, 2022

(30) Foreign Application Priority Data

Sep. 13, 2019 (JP) ................................. 2019-167607

(51) Int. Cl.
*G01N 3/303* (2006.01)
(52) U.S. Cl.
CPC ..... *G01N 3/303* (2013.01); *G01N 2203/0017* (2013.01); *G01N 2203/0039* (2013.01);
(Continued)

(58) Field of Classification Search
CPC ..... G01H 13/00; G01M 99/005; G01N 3/307; G01N 2203/0017; G01N 2203/0658;
(Continued)

(56) References Cited

U.S. PATENT DOCUMENTS

| 6,389,876 B1 * | 5/2002 | Tanimura | ................. G01N 3/06 |
| | | | 73/12.09 |
| 7,331,209 B2 * | 2/2008 | Saari | ......................... G01L 1/26 |
| | | | 73/1.08 |

(Continued)

FOREIGN PATENT DOCUMENTS

| JP | 2006010409 | | 1/2006 |
| JP | 2009294125 A | * | 12/2009 |
| JP | 2019128314 | | 8/2019 |

OTHER PUBLICATIONS

"Office Action of Japan Counterpart Application", issued on Dec. 20, 2022, with English translation thereof, pp. 1-5.

(Continued)

*Primary Examiner* — Judy Nguyen
*Assistant Examiner* — James Split
(74) *Attorney, Agent, or Firm* — JCIPRNET

(57) ABSTRACT

A test result of a tensile test and a measurement result of a natural frequency are easily associated with each other. A high-speed tensile testing machine 1 is a tensile testing machine that executes a tensile test by applying a test force F to a test target TP. The machine includes: a determination unit 513 that determines a timing at which a striking force FD is applied to a testing machine body 2; a striking structure 60 that applies the striking force FD to the testing machine body 2 at the timing determined by the determination unit 513; a first detection unit 514 that detects a
(Continued)

vibration of the testing machine body 2 generated by the striking force FD; a calculation unit 515 that calculates a natural frequency FA of the high-speed tensile testing machine 1 on the basis of a detection result of the first detection unit 514; an execution instruction unit 516 that executes the tensile test; and a recording unit 517 that writes, in a result storage unit 518, information indicating a test result of the tensile test in association with information indicating the natural frequency FA. The timing is included in either before or after the tensile testing machine 1 executes the tensile test.

5 Claims, 11 Drawing Sheets

(52) U.S. Cl.
CPC ................ *G01N 2203/0658* (2013.01); *G01N 2203/0688* (2013.01)

(58) Field of Classification Search
CPC .. G01N 2203/0688; G01N 3/32; G01N 3/303; G01N 2203/0039
See application file for complete search history.

(56) References Cited

U.S. PATENT DOCUMENTS

| | | | |
|---|---|---|---|
| 2019/0154554 A1 * | 5/2019 | Iwakiri | G01N 3/066 |
| 2019/0234846 A1 | 8/2019 | Takii | |
| 2019/0234849 A1 * | 8/2019 | Matsuura | G01L 1/103 |

OTHER PUBLICATIONS

"International Search Report (Form PCT/ISA/210) of PCT/JP2020/000483", mailed on Mar. 10, 2020, with English translation thereof, pp. 1-4.
"Written Opinion of the International Searching Authourity (Form/ISA/237) of PCT/JP2020/000483", mailed on Mar. 10, 2020, with partial English translation thereof, pp. 1-9.
"Office Action of Japan Counterpart Application", issued on Aug. 2, 2022, with English translation thereof, pp. 1-9.
"Office Action of China Counterpart Application", issued on Mar. 14, 2024, with English translation thereof, pp. 1-14.

\* cited by examiner

TENSILE TESTING MACHINE AND METHOD FOR CONTROLLING TENSILE TESTING MACHINE

CROSS-REFERENCE TO RELATED APPLICATION

This application is a 371 application of the International PCT application serial no. PCT/JP2020/000483, filed on Jan. 9, 2020, which claims the priority benefits of Japan Patent Application No. 2019-167607, filed on Sep. 13, 2019. Each of the entirety of the above-mentioned patent applications is hereby incorporated by reference herein and made a part of this specification.

TECHNICAL FIELD

The present invention relates to a tensile testing machine and a method for controlling a tensile testing machine.

BACKGROUND ART

A high-speed tensile testing machine is configured to apply a tensile test force to a test piece by moving a moving-side gripper at a high speed in a state where both ends of the test piece are gripped by the moving-side gripper and a fixed-side gripper (see Patent Literature 1).

In the case of executing a tensile test in which a test force is applied to a test piece in a short time as in such a high-speed tensile testing machine, the collection cycle of data is on the order of microseconds, and thus there is a possibility that a test result is affected even when the natural frequency of a tensile testing machine body is several 10 kHz. That is, during the execution of the tensile test, the force generated along with the resonance of the tensile testing machine body may be superimposed on the force applied to the test piece, and an error may occur in the test result.

In this regard, for example, it is necessary to measure the natural frequency of the tensile testing machine in advance before performing such a tensile test.

CITATION LIST

Patent Literature

Patent Literature 1: JP 2006-10409 A

SUMMARY OF INVENTION

Technical Problem

A method of measuring the natural frequency of the tensile testing machine is adopted as follows, for example. That is, first, a system including a force detector is struck by a hammer, and the output value of the force detector at that time is recorded. Then, the natural frequency is obtained by performing fast Fourier transform (FFT) or the like on the output value.

The natural frequency changes, for example, when a gripper is replaced with another type of gripper in a tensile test. Further, the natural frequency also changes when the size of the test piece is changed. Therefore, it is necessary to associate the test result of the tensile test with the measurement result of the natural frequency.

Conventionally, an operator associates the test result of the tensile test with the measurement result of the natural frequency. However, this work is complicated for the operator. In particular, for an unskilled operator who cannot sufficiently understand the meaning of measuring the natural frequency, it is sometimes difficult to determine the test result of the tensile test to be associated with the measurement result of the natural frequency.

An object of the present invention is to provide an impact testing machine capable of easily associating a test result of a tensile test with a measurement result of a natural frequency, and a method for controlling an impact testing machine.

Solution to Problem

The specification of this application contains the whole content of Japanese Patent Application No. 2019-167607 filed on Sep. 13, 2019.

A first aspect of the present invention relates to a tensile testing machine that executes a tensile test by applying a test force to a test target. The machine includes: a determination unit that determines a timing at which a striking force is applied to a tensile testing machine body; a striking structure that applies the striking force to the tensile testing machine body at the timing determined by the determination unit; a first detection unit that detects a vibration of the tensile testing machine body generated by the striking force; a calculation unit that calculates a natural frequency of the tensile testing machine on the basis of a detection result of the first detection unit; an execution unit that executes the tensile test; and a recording unit that records information indicating a test result of the tensile test in association with information indicating the natural frequency. The timing is either before or after the tensile testing machine executes the tensile test.

A second aspect of the present invention relates to a method for controlling a tensile testing machine that executes a tensile test by applying a tensile force to a test target. The tensile testing machine includes a striking structure that applies a striking force to a tensile testing machine body. The method includes: determining a timing at which the striking force is applied to the tensile testing machine body; applying the striking force to the tensile testing machine body by the striking structure at the timing determined in the determining; detecting a vibration of the tensile testing machine generated by the striking force; calculating a natural frequency of the tensile testing machine on the basis of a detection result in the detecting; executing the tensile test; and recording information indicating a test result of the tensile test in association with information indicating the natural frequency. The timing is either before or after the tensile testing machine executes the tensile test.

Advantageous Effects of Invention

According to the first aspect of the present invention, the calculation unit calculates the natural frequency of the tensile testing machine, the execution unit executes the tensile test, and the recording unit records the information indicating the test result of the tensile test in association with the information indicating the natural frequency.

Therefore, the information indicating the test result of the tensile test is recorded in association with the information indicating the natural frequency. Thus, the test result of the tensile test and the measurement result of the natural frequency can be easily associated with each other.

According to the second aspect of the present invention, the natural frequency of the tensile testing machine is calculated in the calculating, the tensile test is executed in the executing, and the information indicating the test result of the tensile test is recorded in association with the information indicating the natural frequency in the recording.

Therefore, the information indicating the test result of the tensile test is recorded in association with the information indicating the natural frequency. Thus, the test result of the tensile test and the measurement result of the natural frequency can be easily associated with each other.

DESCRIPTION OF EMBODIMENTS

Hereinafter, embodiments of the present invention will be described with reference to the drawings.

1. Configuration of High-Speed Tensile Testing Machine

1-1. Overall Configuration of High-Speed Tensile Testing Machine

Figure 1:
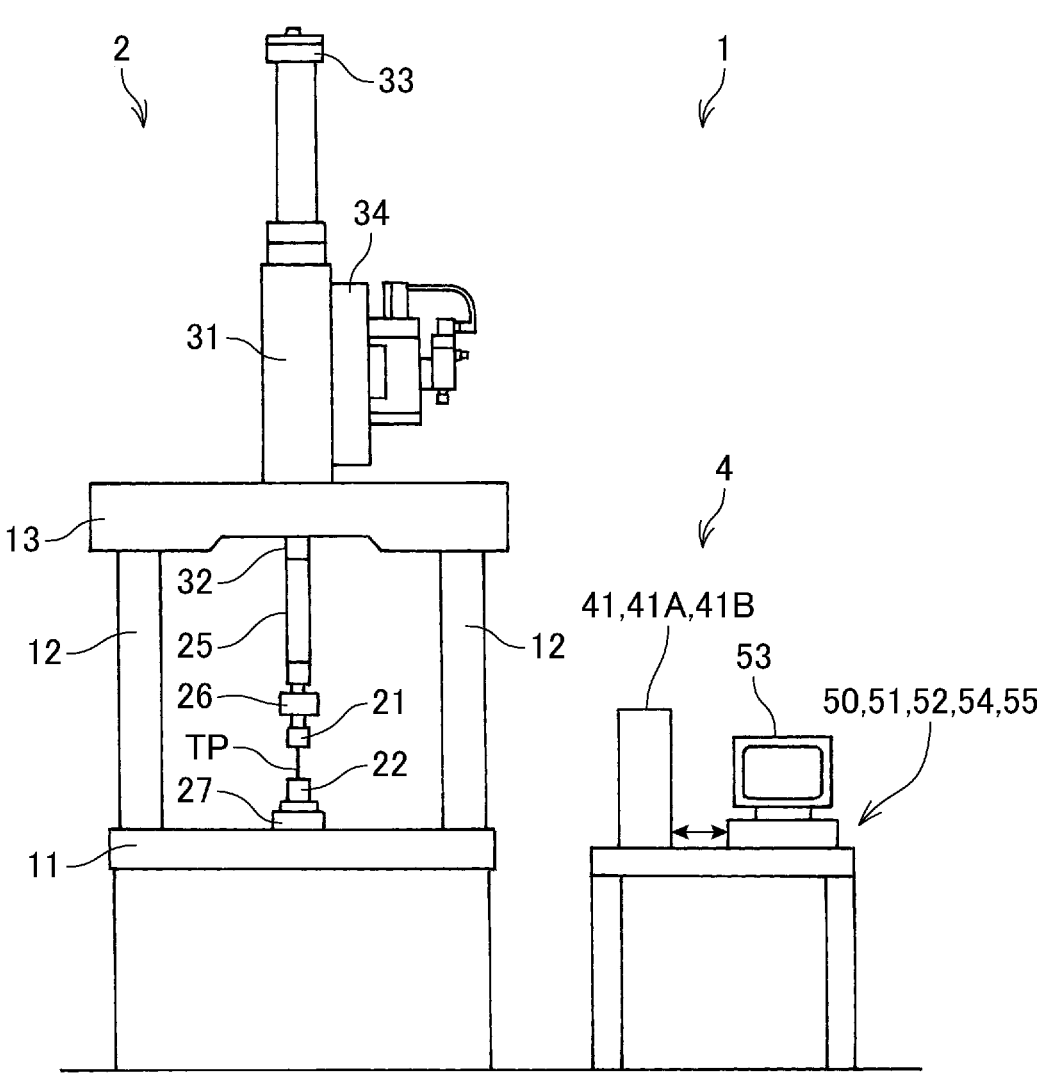
FIG. 1 is a diagram illustrating an example of a configuration of a high-speed tensile testing machine according to this embodiment.

FIG. 1 is a diagram illustrating an example of a configuration of a high-speed tensile testing machine according to this embodiment.

A high-speed tensile testing machine 1 of this embodiment executes a tensile test by applying a test force F to a test target TP. Specifically, the high-speed tensile testing machine 1 applies a tensile force to the test target TP to measure mechanical properties, such as a tensile strength and elongation, of a sample. The high-speed tensile testing machine 1 includes a testing machine body 2 that performs a tensile test by applying the test force F to the test target TP, and a control unit 4 that controls a tensile test operation by the testing machine body 2.

Incidentally, in this embodiment, a case where the test target TP is broken in the tensile test will be described. That is, when the high-speed tensile testing machine 1 executes the tensile test, the test target TP breaks.

Further, this embodiment includes a "first embodiment" described with reference to FIGS. 7 and 8 and a "second embodiment" described with reference to FIGS. 9 to 11.

The high-speed tensile testing machine 1 corresponds to an example of a "tensile testing machine". The testing machine body 2 corresponds to an example of a "tensile testing machine body".

The testing machine body 2 includes a table 11, a pair of support columns 12 erected on the table 11, a cross yoke 13 bridged between the pair of support columns 12, and a hydraulic cylinder 31 fixed to the cross yoke 13.

The table 11 supports the pair of support columns 12. The pair of support columns 12 support the cross yoke 13. The cross yoke 13 supports the hydraulic cylinder 31.

A piston rod 32, a stroke sensor 33, and a servo-valve 34 are arranged in the hydraulic cylinder 31.

The hydraulic cylinder 31 is operated by hydraulic oil supplied from a hydraulic source (not illustrated) arranged in the table via the servo-valve 34.

The piston rod 32 is configured to be retractable to and from the hydraulic cylinder 31.

The stroke sensor 33 detects a movement amount of the piston rod 32. A detection signal of the stroke sensor 33 is transmitted to a main body control device 41.

An upper gripper 21 is connected to the piston rod 32 via an approach jig 25 and a joint 26. Further, a lower gripper 22 is connected to the table 11 via a load cell 27 that detects the test force F.

The testing machine body 2 is provided with an approach section in a tensile direction by the approach jig 25, and pulls up the piston rod 32 at a high speed of, for example, 0.1 to 20 m/sec. As a result, the testing machine body 2 executes a high-speed tensile test in which a pair of grippers, that is, the upper gripper 21 and the lower grippers 22 for gripping both end portions of the test target TP are rapidly separated.

The high-speed tensile test corresponds to an example of a "tensile test".

The displacement of the load mechanism when the high-speed tensile test is executed, that is, the movement amount of the piston rod 32 is detected by the stroke sensor 33, and the test force F at that time is detected by the load cell 27.

The load cell 27 corresponds to an example of a "force detector".

The control unit 4 includes a main body control device 41 that controls the operation of the testing machine body 2, and a personal computer 50.

The main body control device 41 includes a main body memory 41A that stores a control program, a main body processor 41B, such as a central processing unit (CPU) or a micro-processing unit (MPU), that executes various calculations, and a communication unit that communicates with the personal computer 50.

The main body memory 41A, the main body processor 41B, and the communication unit are connected to each other by a bus.

The personal computer 50 includes a control unit 51, a communication unit 52, a display unit 53, a storage unit 54, and an operation unit 55. The control unit 51, the communication unit 52, the display unit 53, the storage unit 54, and the operation unit 55 are connected to each other by a bus.

The control unit 51 controls the operation of the personal computer 50. The control unit 51 includes a memory 51A and a processor 51B. Each of the memory 51A and the processor 51B will be described with reference to FIG. 2.

The communication unit 52 communicates with an external connection device such as the main body control device 41. The communication unit 52 performs wired communication with the main body control device 41 in accordance with, for example, the Ethernet (registered trademark) standard.

In this embodiment, the communication unit 52 performs wired communication with the main body control device 41, but the embodiment of the present invention is not limited thereto. The communication unit 52 may perform wireless communication with the main body control device 41 by, for example, Wi-Fi (registered trademark) or the like.

The display unit 53 displays various images in accordance with an instruction from the control unit 51. The display unit 53 includes, for example, a liquid crystal display (LCD), and displays various images on the LCD.

The storage unit 54 stores time series data of the test force F of the high-speed tensile test, and the like. The storage unit 54 includes a mass storage device such as a hard disk drive (HDD) or a solid state drive (SSD).

The operation unit 55 includes, for example, a mouse and a keyboard, and receives an operation from a user. The operation unit 55 generates an operation signal indicating the operation from the user and transmits the operation signal to the control unit 51.

In this embodiment, the mouse and the keyboard of the operation unit 55 receive the operation from the user, but the present invention is not limited thereto. For example, in a case where a touch sensor is arranged on the surface of the LCD, and a touch panel is configured, the touch panel may receive the operation from the user.

1-2. Configuration of Main Body Control Device and Control Unit

Figure 2:
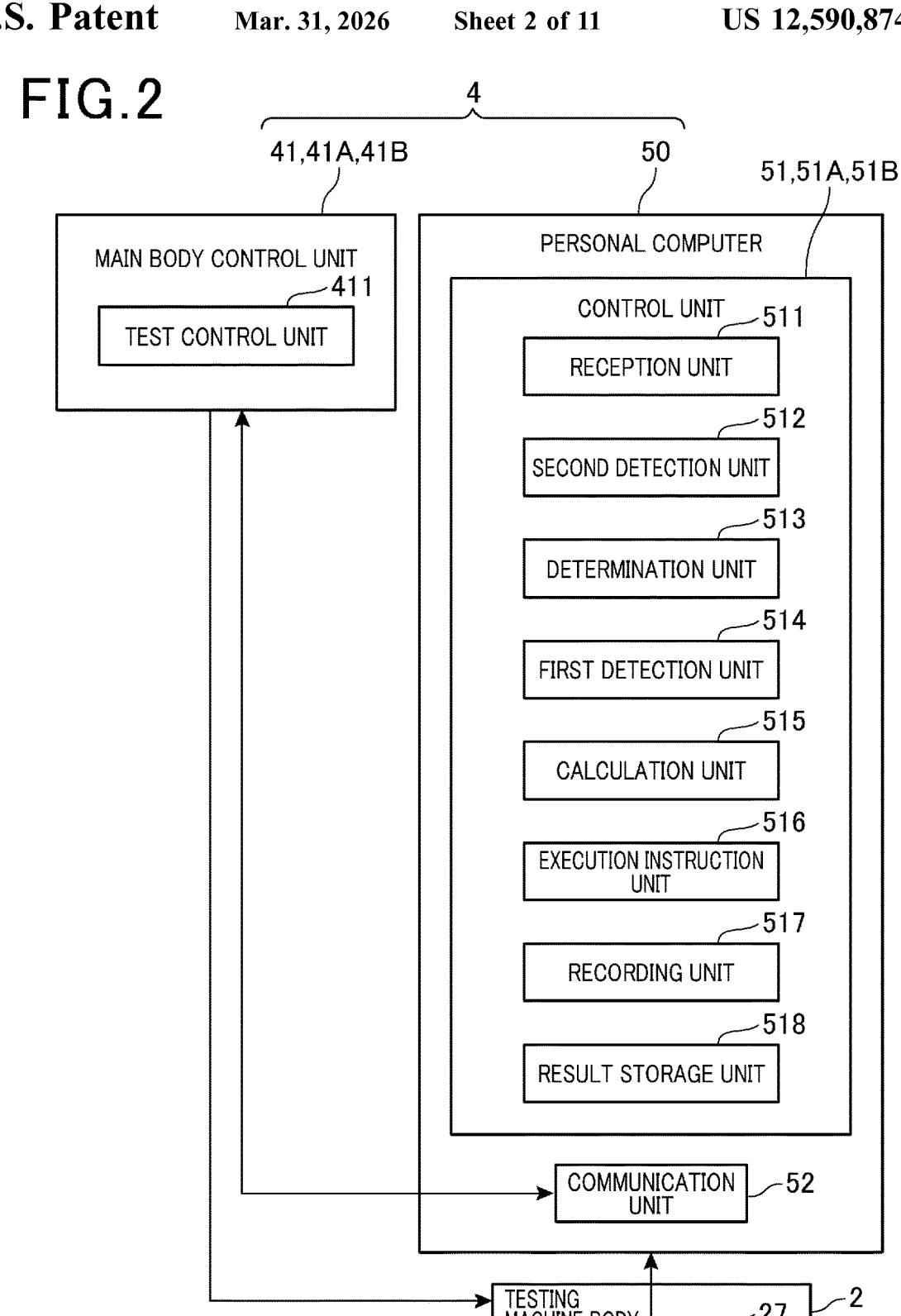
FIG. 2 is a block diagram illustrating an example of a configuration of a main body control device and a control unit.

FIG. 2 is a block diagram illustrating an example of configurations of the main body control device 41 and the control unit 51.

As illustrated in FIG. 2, the main body control device 41 includes a test control unit 411. Specifically, the main body processor 41B of the main body control device 41 executes a control program to function as the test control unit 411.

The test control unit 411 causes the testing machine body 2 to execute a tensile test. Specifically, the main body control device 41 causes the testing machine body 2 to execute the tensile test in accordance with an instruction of an execution instruction unit 516 of the control unit 51.

More specifically, when executing the tensile test, the test control unit 411 supplies a control signal to the servo-valve 34 to operate the hydraulic cylinder 31. Further, the test control unit 411 fetches the output signal of the stroke sensor 33 and the output signal of the load cell 27 into the main body control device 41 every predetermined time.

The high-speed tensile testing machine 1 includes a striking structure 60. The striking structure 60 applies a striking force FD to the testing machine body 2. The striking structure 60 will be described later in detail with reference to FIGS. 3 and 4.

The control unit 51 includes a memory 51A and a processor 51B.

The memory 51A includes a read only memory (ROM) that stores a control program and the like, a random access memory (RAM) that loads the control program and temporarily stores data when executing the control program, and the like.

The processor 51B includes a CPU, an MPU, and the like that execute various calculations. The processor 51B may be configured by a single processor, or may be configured such that a plurality of processors function as the processor 51B.

The control unit 51 includes a reception unit 511, a second detection unit 512, a determination unit 513, a first detection unit 514, a calculation unit 515, an execution instruction unit 516, a recording unit 517, and a result storage unit 518.

Specifically, the processor 51B of the control unit 51 executes the control program stored in the memory 51A to function as the reception unit 511, the second detection unit 512, the determination unit 513, the first detection unit 514, the calculation unit 515, the execution instruction unit 516, and the recording unit 517. Further, the processor 51B of the control unit 51 executes the control program stored in the memory 51A to cause the memory 51A to function as the result storage unit 518.

The result storage unit 518 stores information indicating a test result of the tensile test in association with information indicating a natural frequency. In the result storage unit 518, the information indicating the test result of the tensile test and the information indicating the natural frequency are written by the recording unit 517.

The reception unit 511 receives an input from the user giving an instruction on execution of the tensile test.

For example, when a test start button is displayed on the LCD of the display unit 53, and the test start button is pressed by the user, the reception unit 511 receives the input from the user giving an instruction on the execution of the tensile test. Specifically, in a state where a cursor is arranged on the test start button, when the left click of the mouse is received, the reception unit 511 receives that the test start button is pressed by the user.

In this embodiment, the test start button is displayed on the LCD of the display unit 53, but the embodiment of the present invention is not limited thereto. For example, the test start button may be arranged as a hardware push-button switch on the testing machine body 2.

The second detection unit 512 detects that the vibration of the testing machine body 2 caused by the breakage of the test target TP converges. In this embodiment, the vibration of the testing machine body 2 is detected by the load cell 27.

The processing of the second detection unit 512 will be described later in detail with reference to FIG. 11.

The determination unit 513 determines a timing at which the striking force FD is applied to the testing machine body 2.

The determination unit 513 determines the timing at which the striking force FD is applied to the testing machine body 2 on the basis of, for example, the operation from the user. The striking structure 60 applies the striking force FD to the testing machine body 2 at the timing determined by the determination unit 513.

The timing at which the striking force FD is applied is included either before or after the high-speed tensile testing machine 1 executes the tensile test. For example, the determination unit 513 determines the timing at which the striking force FD is applied to the timing after the reception unit 511 receives the input from the user. Further, for example, the determination unit 513 determines the timing at which the striking force FD is applied to the timing after the second detection unit 512 detects that the vibration of the testing machine body 2 converges. For example, the user causes the testing machine to store a test process in advance as scheduling content, so that the determination unit 513 determines, on the basis of the test process, the timing at which the striking force FD is applied.

An aspect in which the timing at which the striking force FD is applied is before the high-speed tensile testing machine 1 executes the tensile test corresponds to the first embodiment. The first embodiment will be described in detail later with reference to FIGS. 7 and 8.

Further, an aspect in which the timing at which the striking force FD is applied is after the high-speed tensile testing machine 1 executes the tensile test corresponds to the second embodiment. The second embodiment will be described in detail later with reference to FIGS. 9 to 11.

The first detection unit 514 detects the vibration of the testing machine body 2 generated by the striking force FD applied by the striking structure 60. Specifically, the first detection unit 514 detects the vibration of the testing machine body 2 generated by the striking force FD by the load cell 27.

The calculation unit 515 calculates a natural frequency FA of the high-speed tensile testing machine 1 on the basis of a detection result of the first detection unit 514.

Specifically, the calculation unit 515 executes fast Fourier transform (FFT) on a detection signal of a measurement value of a load cell 14 to generate a frequency spectrum SP of the high-speed tensile testing machine 1. Then, the calculation unit 515 calculates the natural frequency FA of the high-speed tensile testing machine 1 from the frequency spectrum SP of the high-speed tensile testing machine 1.

The frequency spectrum SP will be described in detail later with reference to FIG. 5.

The execution instruction unit 516 instructs the high-speed tensile testing machine 1 to execute a tensile test.

Specifically, the execution instruction unit 516 instructs the test control unit 411 of the main body control device 41 to execute the tensile test. The test control unit 411 causes the high-speed tensile testing machine 1 to execute the tensile test in accordance with the instruction from the execution instruction unit 516.

The execution instruction unit 516 corresponds to an example of an "execution unit".

The recording unit 517 records information indicating a test result of the tensile test in association with information indicating the natural frequency FA. Specifically, the recording unit 517 writes the information indicating the test result of the tension test in the result storage unit 518 in association with the information indicating the natural frequency FA.

1-2. Configuration of Striking Structure

Figure 3:
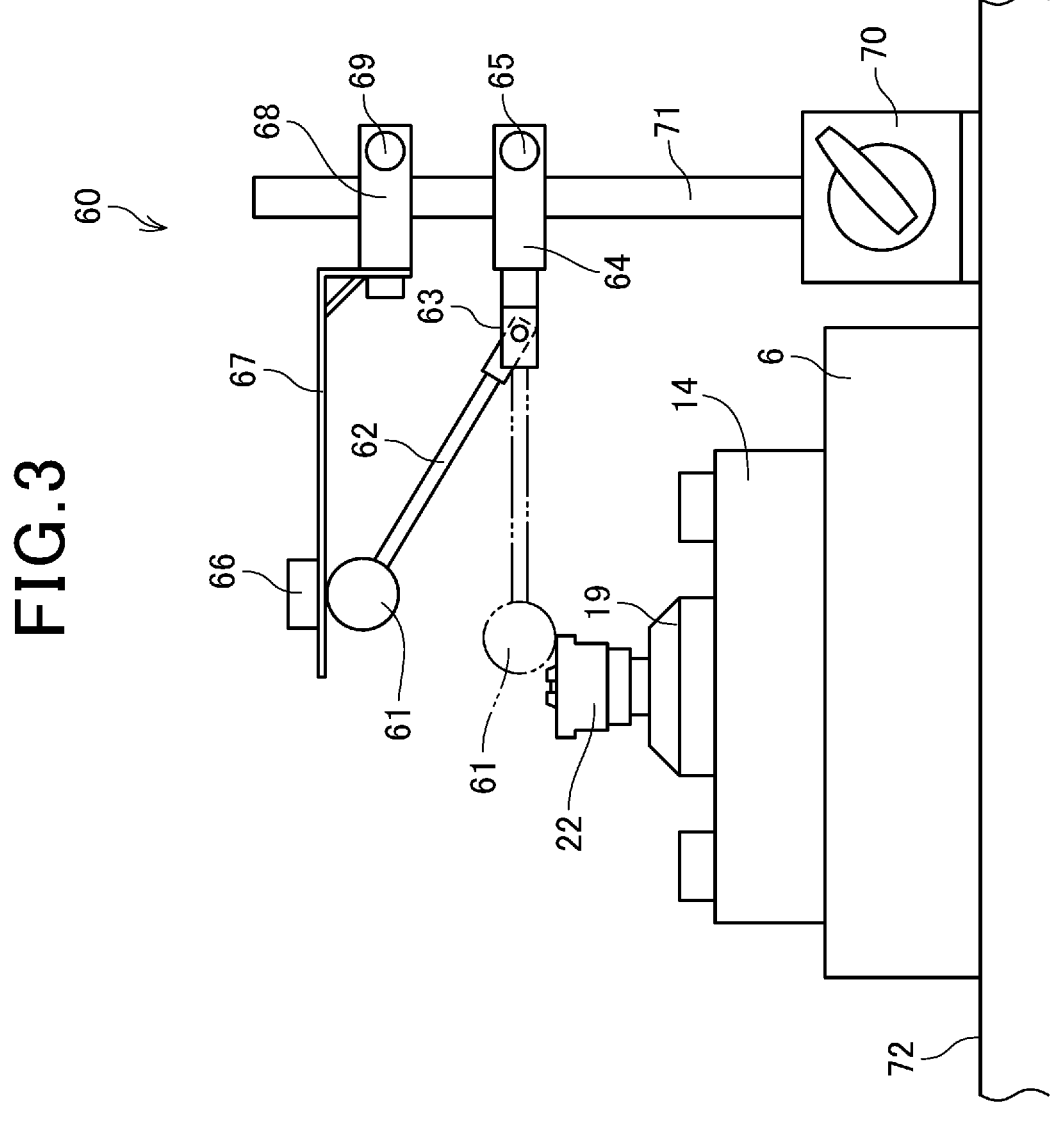
FIG. 3 is a diagram illustrating an example of a configuration of a striking structure.

FIG. 3 is a diagram illustrating an example of a configuration of the striking structure 60.

The striking structure 60 applies the striking force FD to the testing machine body 2 at least either before or after the high-speed tensile testing machine 1 executes the tensile test.

The striking structure 60 includes a support shaft 63, an electromagnet 66, a steel ball 61, a magnet stand 70, a support portion 64, a support plate 67, and a support portion 68.

The magnet stand 70 is fixed to the upper surface of a base 72. The magnet stand 70 supports the support column 71 in the state of being arranged in a vertical direction. The support shaft 63 and the electromagnet 66 are arranged to be movable up and down with respect to the support column 71.

Specifically, the support portion 64 is movable up and down with respect to the support column 71, and supports the support shaft 63. The support portion 64 can fix the support shaft 63 to an arbitrary height position of the support column 71 by operating a screw 65.

The support portion 68 is movable up and down with respect to the support column 71 and supports the support plate 67. Further, in the support portion 68 can fix the support plate 67 to an arbitrary height position of the support column 71 by operating the screw 69.

The support plate 67 supports the electromagnet 66. In other words, the electromagnet 66 is placed on the upper surface of the support plate 67. The electromagnet 66 is configured to be able to be turned on and off. As indicated by a solid line in FIG. 3, when the steel ball 61 is arranged at a height position in contact with the lower surface of the support plate 67, the electromagnet 66 fixes the steel ball 61 at a position in contact with the lower surface of the support plate 67 by a magnetic force. Hereinafter, the height position at which the steel ball 61 abuts on the lower surface of the support plate 67 is referred to as a "standby position".

Further, when the electromagnet 66 is switched from an on state to an off state in the state indicated by the solid line in FIG. 3, the steel ball 61 drops from the standby position indicated by the solid line in FIG. 3 and enters the state indicated by a virtual line in FIG. 3.

The electromagnet 66 is switched from the on state to the off state in accordance with an instruction from the control unit 51.

The striking structure 60 further includes an arm 62.

The arm 62 is rotatable about the support shaft 63.

The steel ball 61 is fixed to an end portion of the arm 62 opposite to the support shaft 63. The steel ball 61 is made of steel as a magnetic body. In this embodiment, the steel ball 61 is made of steel, but it is sufficient if the steel ball 61 includes a magnetic body. For example, the steel ball 61 may be a stainless sphere.

The electromagnet 66 fixes the steel ball 61 at the standby height position and releases the fixation at the standby position, thereby dropping the steel ball 61 from the standby height position along with the rotation of the arm 62.

The electromagnet 66 fixes the steel ball 61 at the standby position by the magnetic force.

For example, the striking structure 60 applies the striking force FD to the testing machine body 2 in a direction parallel to the direction in which the test force F acts when the tensile test is executed.

Specifically, the steel ball 61 is dropped from the position (standby position) indicated by the solid line in FIG. 3 to a position indicated by a two-dot chain line in FIG. 3 along with the rotation of the arm 62. The support shaft 63 of the arm 62 reaches the horizontal position of the center of the steel ball 61 when the steel ball 61 reaches the position indicated by the two-dot chain line in FIG. 3. In other words, when the steel ball 61 reaches the position indicated by the two-dot chain line in FIG. 3, the arm 62 is arranged along the horizontal direction. Further, when the steel ball 61 reaches the position indicated by the two-dot chain line in FIG. 3, the steel ball 61 applies the striking force FD in the vertical direction to the testing machine body 2.

The testing machine body 2 includes the lower gripper connected to the load cell 14. The lower gripper 22 corresponds to an example of a "gripper". The steel ball 61 applies the striking force FD to the lower gripper 22.

Specifically, the striking structure 60 drops the steel ball 61 from the position (standby height position) indicated by the solid line in FIG. 3 to the position indicated by the two-dot chain line in FIG. 3 along with the rotation of the arm 62, when the steel ball 61 reaches the position indicated by the two-dot chain line in FIG. 3, the steel ball 61 applies the striking force FD to the lower gripper 22.

Figure 4:
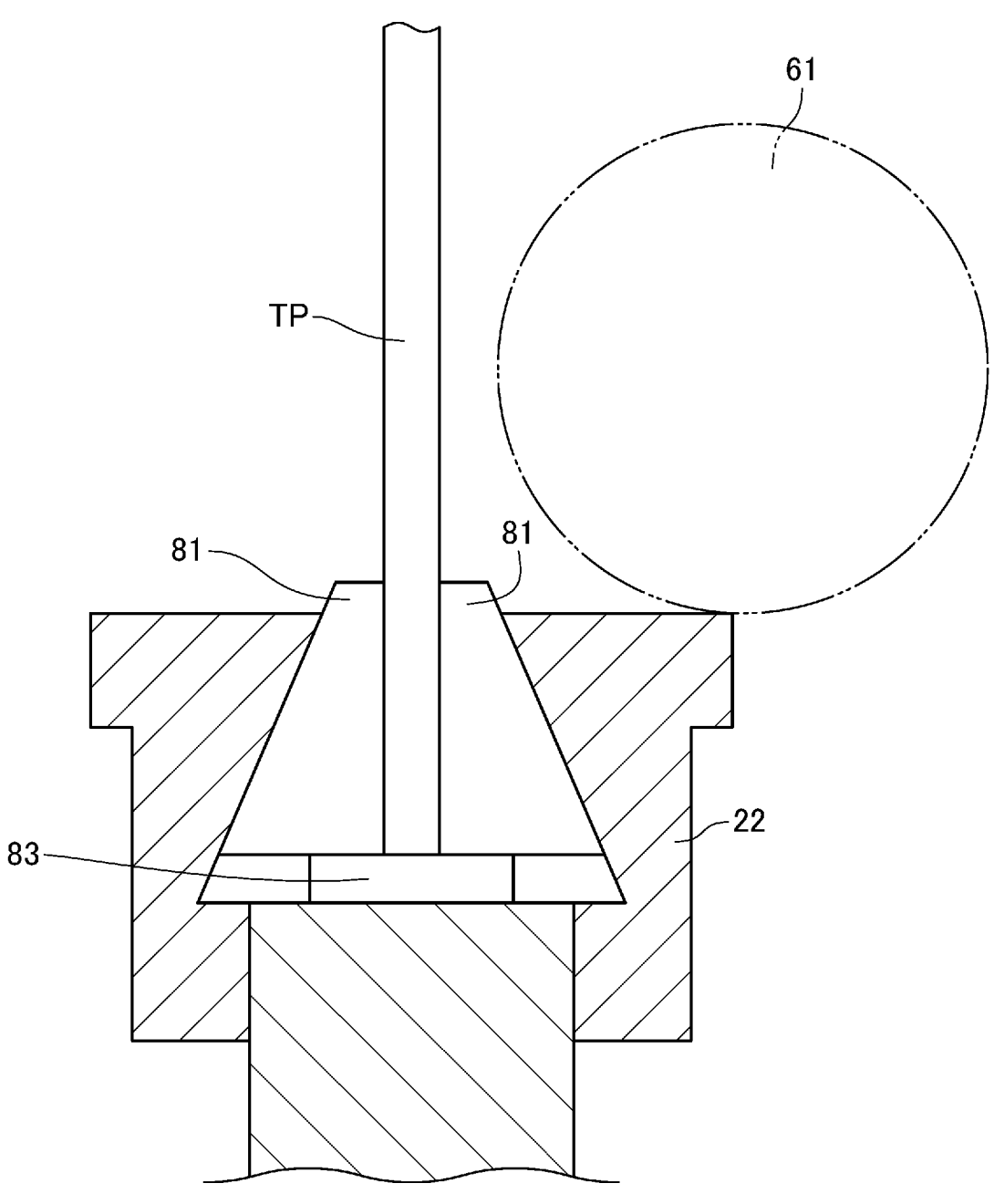
FIG. 4 is a diagram illustrating an example of a configuration of a lower gripper.

FIG. 4 is a diagram illustrating a configuration of the lower gripper 22 when the striking structure 60 applies the striking force FD to the lower gripper 22.

As illustrated in FIG. 4, the lower gripper 22 includes a pair of gripping teeth 81 and a support plate 83. The pair of gripping teeth 81 grip the test target TP arranged on the support plate 83.

As described above, the pair of gripping teeth 81 grip the test target TP, and thus when the striking structure 60 applies the striking force FD to the lower gripper 22, the lower gripper 22 vibrates integrally with the gripping teeth 81.

Further, it is possible to suppress that the positional deviation of the pair of gripping teeth 81 occurs when the pair of gripping teeth 81 and the steel ball 61 collide with each other.

Incidentally, in this embodiment, the steel ball 61 collides with the lower gripper 22, but the embodiment of the present invention is not limited thereto. For example, the steel ball 61 may collide with at least one of the pair of gripping teeth 81. For example, the steel ball 61 may collide with the load cell 27.

1-3. Method for Measuring Natural Vibration

Figure 5:
FIG. 5 is a diagram illustrating an example of a frequency spectrum indicating a natural vibration.
Figure 5:
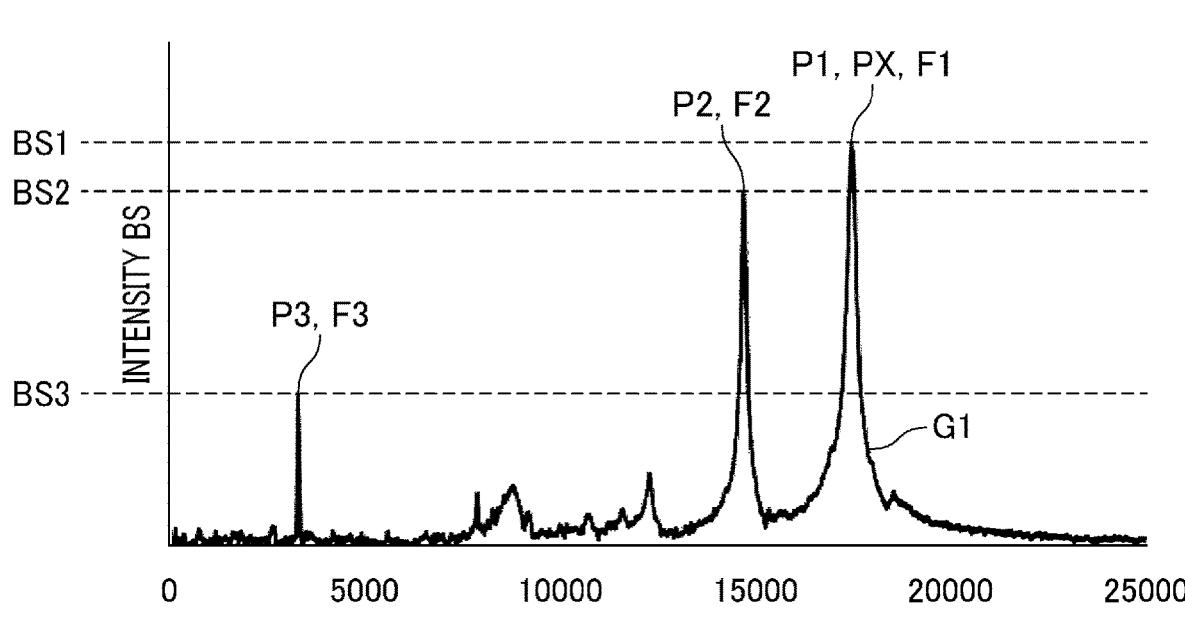

FIG. 5 is a diagram illustrating an example of the frequency spectrum SP indicating the natural vibration of the testing machine body 2.

The horizontal axis in FIG. 5 represents a frequency FR, and the vertical axis in FIG. 5 represents an intensity BS. A graph G1 illustrated in FIG. 5 illustrates a relationship between the frequency FR and the intensity BS in the frequency spectrum SP. As illustrated in FIG. 5, the frequency spectrum SP includes a first peak P1, a second peak P2, and a third peak P3.

A frequency F1 of the first peak P1 is 17.55 kHz, and an intensity BS1 of the first peak P1 is larger than an intensity BS2 of the second peak P2 and an intensity BS3 of the third peak P3. In other words, the first peak P1 indicates a maximum peak PX.

A frequency F2 of the second peak P2 is 14.70 kHz, and the intensity BS2 of the second peak P2 is larger than the intensity BS3 of the third peak P3 and smaller than the intensity BS1 of the first peak P1.

A frequency F3 of the third peak P3 is 3.50 kHz, and the intensity BS3 of the third peak P3 is smaller than each of the intensity BS1 of the first peak P1 and the intensity BS2 of the second peak P2.

For example, the calculation unit 515 calculates the frequency F1 of the maximum peak PX as the natural frequency FA of the tensile testing machine 1. Then, the frequency F1 of the maximum peak PX is stored as the natural frequency FA in the result storage unit 518.

Figure 6:
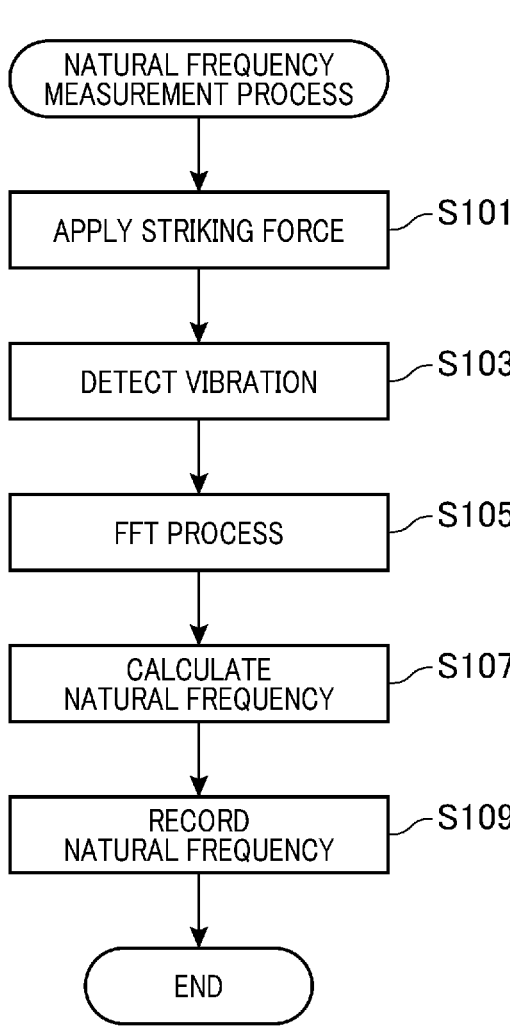
FIG. 6 is a flowchart illustrating an example of a natural frequency measurement process of the control unit.

FIG. 6 is a flowchart illustrating an example of a "natural frequency measurement process" of the control unit 51. The "natural frequency measurement process" indicates a process of measuring the natural frequency FA of the tensile testing machine 1 and recording the natural frequency FA in the result storage unit 518.

Incidentally, the "natural frequency measurement process" is executed at least either before or after the high-speed tensile testing machine 1 executes the tensile test.

First, in step S101, the control unit 51 causes the striking structure 60 to apply the striking force FD to the testing machine body 2.

Specifically, when the control unit 51 turns the electromagnet 66 illustrated in FIG. 3 from the on state to the off state, the steel ball 61 drops from the position indicated by the solid line in FIG. 3 to the position indicated by the two-dot chain line in FIG. 3. As a result, the steel ball 61 applies the striking force FD to the lower gripper 22.

Next, in step S103, the load cell 14 detects the vibration of the testing machine body 2, and the first detection unit 514 acquires the detection signal of the measurement value of the load cell 14.

Next, in step S105, the calculation unit 515 executes FFT on the detection signal of the measurement value of the load cell 14 to generate the frequency spectrum SP of the testing machine body 2.

Next, in step S107, the calculation unit 515 calculates the natural frequency FA of the testing machine body 2. Specifically, the calculation unit 515 calculates the natural frequency FA of the high-speed tensile testing machine 1 from the frequency spectrum SP of the testing machine body 2.

Next, in step S109, the recording unit 517 writes information indicating the natural frequency FA into the result storage unit 518, and the process ends.

Incidentally, step S101 corresponds to an example of a "striking step". Step S103 corresponds to an example of a "detection step". Steps S105 and S107 correspond to an example of a "calculation step".

2. First Embodiment

Next, the processing of the control unit 51 according to the first embodiment will be described in detail with reference to FIGS. 7 and 8.

In the first embodiment, the timing at which the striking structure 60 applies the striking force FD to the testing machine body 2 is before the high-speed tensile testing machine 1 executes the tensile test. That is, the determination unit 513 determines the timing at which the striking structure 60 applies the striking force FD to the testing machine body 2 to be a timing before the high-speed tensile testing machine 1 executes the tensile test.

Figure 8:
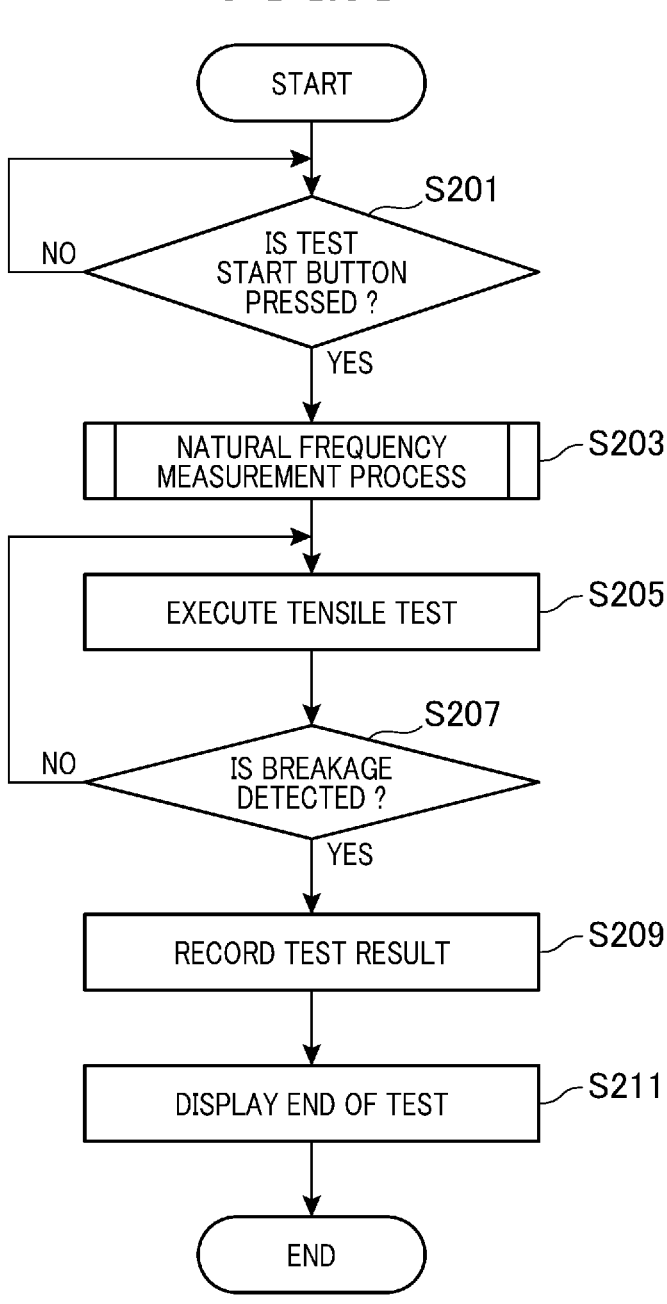
FIG. 8 is a flowchart illustrating the example of the processing of the control unit according to the first embodiment.

The processing of the determination unit 513 determining the timing at which the striking force FD is applied to the testing machine body 2 is executed before the start time of the processing of step S101 of the flowchart illustrated in FIG. 8.

Figure 7:
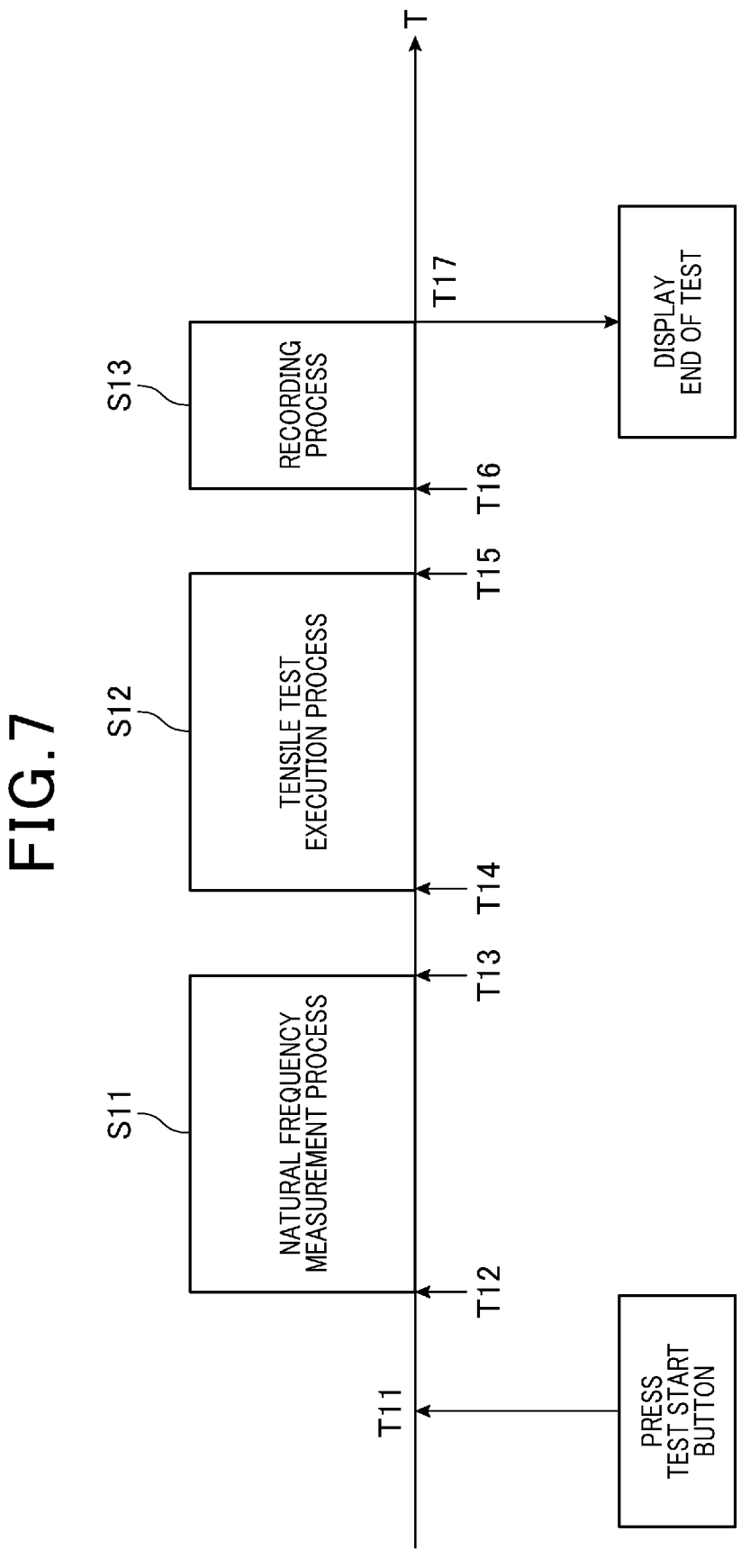
FIG. 7 is a time chart illustrating an example of processing of the control unit according to a first embodiment.

FIG. 7 is a time chart illustrating an example of the processing of the control unit 51 in the first embodiment.

The horizontal axis in FIG. 7 indicates time T.

As illustrated in FIG. 7, at time T11, the control unit 51 receives the pressing of the test start button.

Incidentally, in the first embodiment, a case where a preparation for performing the tensile test of the test target TP is completed before the time T11 will be described. That is, the upper gripper 21 and the lower grippers 22 are attached to the testing machine body 2, and the test target TP is fixed to each of the upper gripper 21 and the lower grippers 22.

Next, at time T12, the control unit 51 starts execution of a natural frequency measurement process S11. Next, at time T13, the control unit 51 ends the execution of the natural frequency measurement process S11.

Next, at time T14, the control unit 51 starts execution of a tensile test execution process S12. The "tensile test execution process" indicates a process in which the control unit 51 causes the high-speed tensile testing machine 1 to execute a tensile test. Next, at time T15, the control unit 51 ends the execution of the tensile test execution process S12.

Next, at time T16, the control unit 51 starts execution of a recording process S13. The "recording process" indicates a process in which the control unit 51 writes, in the result storage unit 518, the information indicating the test result of the tensile test in association with the information indicating the natural frequency FA. Next, at time T17, the control unit 51 ends the execution of the recording process S13 and displays the end of the test on the LCD of the display unit 53.

Incidentally, in order to shorten a series of processing times, each of an interval between the time T11 and the time T12 and an interval between the time T15 and the time T16 is preferably short.

Further, an interval between the time T13 and the time T14 is determined according to the vibration state of the testing machine body 2. That is, in the natural frequency measurement process S11, the testing machine body 2 is vibrated by the striking force FD applied to the testing machine body 2 by the striking structure 60. When the tensile test execution processing S12 is started in a state where the amplitude of this vibration is large, this vibration may affect the test result. In this regard, when the amplitude of the vibration of the testing machine body 2 becomes equal to or less than a predetermined amplitude, the tensile test execution process S12 is started.

FIG. 8 is a flowchart illustrating an example of the processing of the control unit 51 according to the first embodiment.

First, in step S201, the reception unit 511 determines whether the test start button is pressed by the user.

When the reception unit 511 determines that the test start button is not pressed by the user (step S201; NO), the process enters a standby state. When the reception unit 511 determines that the test start button is pressed by the user (step S201; YES), the process proceeds to step S203.

Then, in step S203, the control unit 51 executes the "natural frequency measurement process" illustrated in FIG. 6.

Next, in step S205, the execution instruction unit 516 instructs the high-speed tensile testing machine 1 to execute the tensile test. Specifically, the execution instruction unit 516 instructs the test control unit 411 of the main body control device 41 to execute the tensile test. The test control unit 411 causes the high-speed tensile testing machine 1 to execute the tensile test in accordance with the instruction from the execution instruction unit 516.

Next, in step S207, the control unit 51 determines whether the breakage of the test target TP is detected.

When the control unit 51 determines that the breakage of the test target TP is not detected (step S207; NO), the process returns to step S205. When the control unit 51 determines that the breakage of the test target TP is detected (step S207; YES), the process proceeds to step S209.

Then, in step S209, the recording unit 517 writes, in the result storage unit 518, the information indicating the test result of the tensile test in association with the information indicating the natural frequency FA.

Next, in step S211, the control unit 51 displays the end of the test on the LCD of the display unit 53, and the process ends.

Step S205 corresponds to an example of an "execution step". Step S209 corresponds to an example of a "recording step".

3. Second Embodiment

Next, the processing of the control unit 51 according to the second embodiment will be described in detail with reference to FIGS. 9 to 11.

In the second embodiment, the timing at which the striking structure 60 applies the striking force FD to the testing machine body 2 is after the high-speed tensile testing machine 1 executes the tensile test. That is, the determination unit 513 determines the timing at which the striking structure 60 applies the striking force FD to the testing machine body 2 to be the timing after the high-speed tensile testing machine 1 executes the tensile test.

Figure 10:
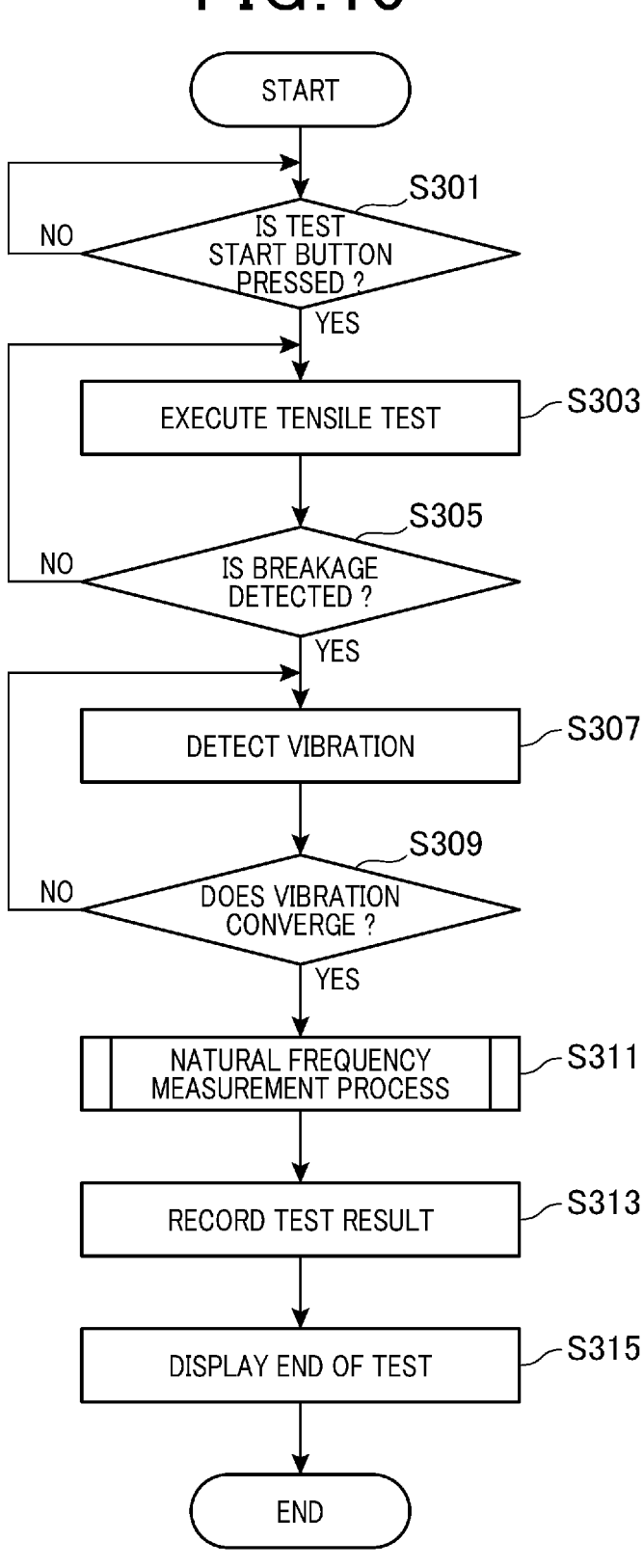
FIG. 10 is a flowchart illustrating an example of the processing of the control unit according to the second embodiment.

The processing of the determination unit 513 determining the timing at which the striking force FD is applied to the testing machine body 2 is executed before the time point of starting the processing of step S101 of the flowchart illustrated in FIG. 10.

Figure 9:
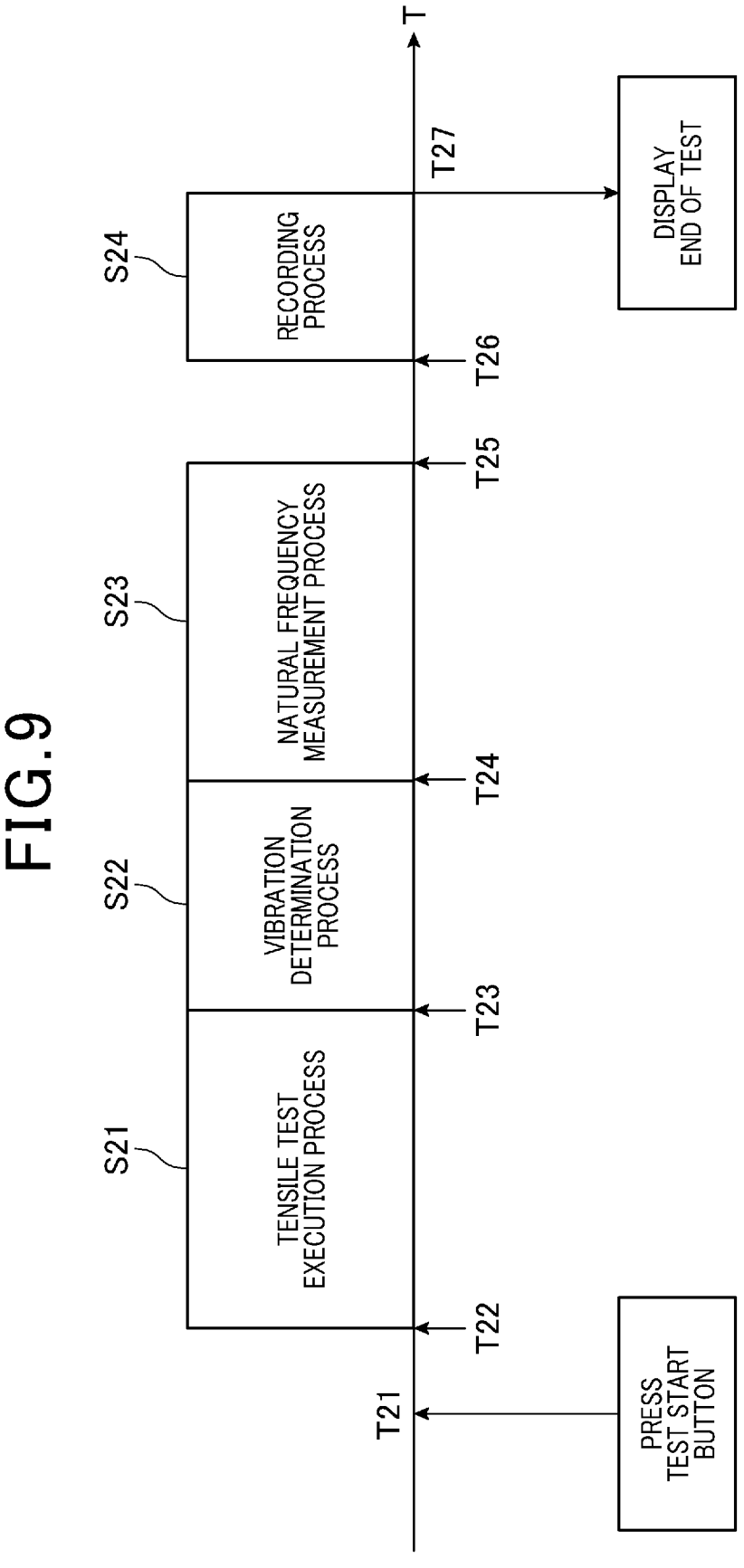
FIG. 9 is a time chart illustrating an example of processing of a control unit according to a second embodiment.

FIG. 9 is a time chart illustrating an example of the processing of the control unit 51 in the second embodiment.

The horizontal axis in FIG. 9 indicates the time T.

As illustrated in FIG. 9, at time T21, the control unit 51 receives the pressing of the test start button.

Incidentally, in the second embodiment, a case where the preparation for performing the tensile test of the test target TP is completed before the time T21 will be described. That is, the upper gripper 21 and the lower grippers 22 are attached to the testing machine body 2, and the test target TP is fixed to each of the upper gripper 21 and the lower grippers 22.

Then, at time T22, the control unit 51 starts execution of a tensile test execution process S21. The "tensile test execution process" indicates a process in which the control unit 51 causes the high-speed tensile testing machine 1 to execute a tensile test.

Then, at time T23, the control unit 51 ends the execution of the tensile test execution process S21 and starts execution of a vibration determination process S22.

The "vibration determination process" indicates a process of determining whether the vibration of the testing machine body 2 associated with the execution of the tensile test execution process S21 converges. The "vibration determination process" will be described later in detail with reference to FIG. 11.

Then, at time T24, the control unit 51 ends the execution of the vibration determination process S22 and starts execution of a natural frequency measurement process S23.

Next, at time T25, the execution of the natural frequency measurement process S23 ends.

Next, at time T26, the control unit 51 starts execution of a recording process S24. The "recording process" indicates a process in which the control unit 51 writes, in the result storage unit 518, the information indicating the test result of the tensile test in association with the information indicating the natural frequency FA.

Next, at time T27, the control unit 51 ends the execution of the recording process S24 and displays the end of the test on the LCD of the display unit 53.

Incidentally, in order to shorten a series of processing times, each of an interval between the time T21 and the time T22 and an interval between the time T25 and the time T26 is preferably short.

FIG. 10 is a flowchart illustrating an example of the processing of the control unit 51 according to the second embodiment.

First, in step S301, the reception unit 511 determines whether the test start button is pressed by the user.

When the reception unit 511 determines that the test start button has not been pressed by the user (step S301; NO), the process enters a standby state. When the reception unit 511 determines that the test start button has been pressed by the user (step S301; YES), the process proceeds to step S303.

Then, in step S303, the execution instruction unit 516 instructs the high-speed tensile testing machine 1 to execute the tensile test. Specifically, the execution instruction unit 516 instructs the test control unit 411 of the main body control device 41 to execute the tensile test. The test control unit 411 causes the high-speed tensile testing machine 1 to execute the tensile test in accordance with the instruction from the execution instruction unit 516.

Next, in step S305, the control unit 51 determines whether the breakage of the test target TP is detected.

When the control unit 51 determines that the breakage of the test target TP is not detected (step S305; NO), the process returns to step S303. When the control unit 51 determines that the breakage of the test target TP is detected (step S305; YES), the process proceeds to step S307.

Next, in step S307, the second detection unit 512 detects the vibration of the testing machine body 2 caused by the breakage of the test target TP.

Next, in step S309, the second detection unit 512 determines whether the vibration of the testing machine body 2 caused by the breakage of the test target TP converges.

When the second detection unit 512 determines that the vibration of the testing machine body 2 does not converge (step S309; NO), the process returns to step S307. When the second detection unit 512 determines that the vibration of the testing machine body 2 converges (step S309; YES), the process proceeds to step S311.

Then, in step S311, the control unit 51 executes the "natural frequency measurement process" illustrated in FIG. 6.

Next, in step S313, the recording unit 517 writes, in the result storage unit 518, the information indicating the test result of the tensile test in association with the information indicating the natural frequency FA.

Next, in step S315, the control unit 51 displays the end of the test on the LCD of the display unit 53, and the process ends.

Step S303 corresponds to an example of an "execution step". Step S313 corresponds to an example of a "recording step".

Figure 11:
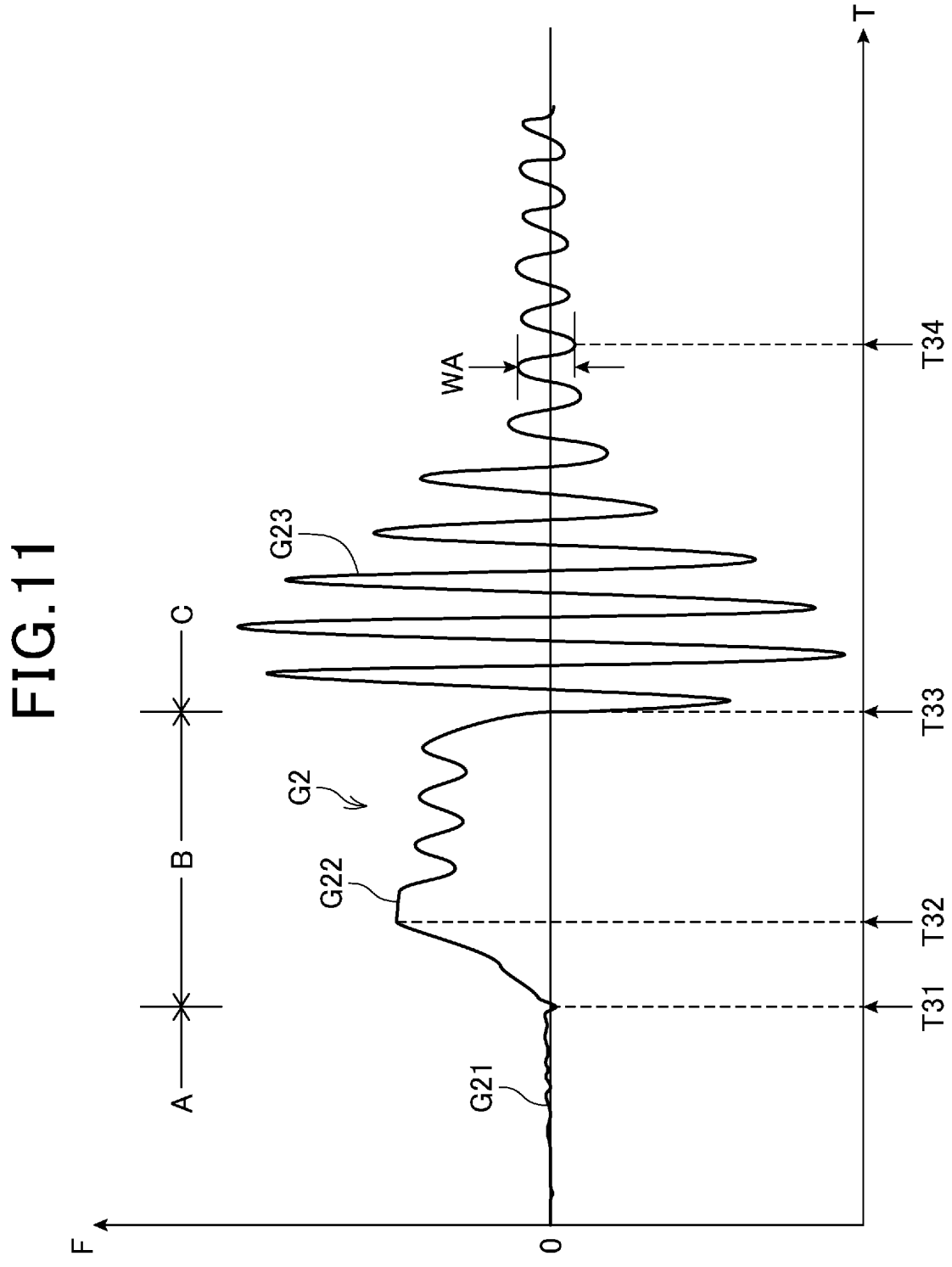
FIG. 11 is a graph illustrating an example of processing of a second detection unit according to the second embodiment.

FIG. 11 is a graph illustrating an example of the processing of the second detection unit 512 in the second embodiment.

In FIG. 11, the horizontal axis represents the time T, and the vertical axis represents the test force F applied to the test target TP. The test force F is detected by the load cell 27.

As illustrated in a graph G2 in FIG. 11, at time T31, the test force F is applied to the test target TP, and the test target TP starts elastic deformation.

Next, at time T32, the test target TP starts plastic deformation, and at time T33, the test target TP breaks.

When the test target TP breaks, the testing machine body 2 vibrates, so that the test force F detected by the load cell 27 vibrates. An amplitude W of the vibration of the testing machine body 2 decreases with the lapse of time. Then, at time T34, the amplitude W of the vibration of the testing machine body 2 becomes equal to or less than a predetermined amplitude WA. When the amplitude W becomes equal to or less than the predetermined amplitude WA, the second detection unit 512 detects that the vibration of the testing machine body 2 caused by the breakage of the test target TP converges.

A period A indicates a period before the time T31 at which the application of the test force F to the test target TP is started. A period B is a period in which the test force F is applied to the test target TP, and indicates a period from the time T31 at which the tensile test is started to the time T33 at which the test target TP breaks. A period C indicates a time after the time T33 at which the test target TP breaks.

The graph G2 includes a graph G21, a graph G22, and a graph G23. The Graph G21 corresponds to the period A, the graph G22 corresponds to the period B, and the graph G23 corresponds to the period C.

The information indicating the test result of the tensile test written in the result storage unit 518 by the recording unit 517 includes data indicating the graph G22 in the period B.

4. Embodiments and Effects

It is understood by those skilled in the art that the above-described embodiments and modifications are specific examples of the following aspects.

(Item 1)
A tensile testing machine according to one aspect is a tensile testing machine that executes a tensile test by applying a test force to a test target. The machine includes: a determination unit that determines a timing at which a striking force is applied to a tensile testing machine body; a striking structure that applies the striking force to the tensile testing machine body at the timing determined by the determination unit; a first detection unit that detects a vibration of the tensile testing machine body generated by the striking force; a calculation unit that calculates a natural frequency of the tensile testing machine on the basis of a detection result of the first detection unit; an execution unit that executes the tensile test; and a recording unit that records information indicating a test result of the tensile test in association with information indicating the natural frequency. The timing is either before or after the tensile testing machine executes the tensile test.

According to the tensile testing machine described in item 1, the information indicating the test result of the tensile test is recorded in association with the information indicating the natural frequency. Thus, the test result of the tensile test and the measurement result of the natural frequency can be easily associated with each other.

(Item 2)
The tensile testing machine described in item 1 further includes: a reception unit that receives an input from a user giving an instruction on execution of the tensile test. The timing is included before the tensile testing machine executes the tensile test, the determination unit determines the timing to be a timing after the reception unit receives the input from the user, and the execution unit executes the tensile test after the calculation unit calculates the natural frequency.

According to the tensile testing machine described in item 2, the timing at which the striking force is applied to the tensile testing machine body is determined to be the timing after the input from the user is received, and the tensile test is executed after the natural frequency is calculated. Thus, the timing at which the striking force is applied to the tensile testing machine body can be determined to be an appropriate timing. That is, the striking force is applied to the tensile testing machine body before the tensile test is executed. Thus, the natural frequency of the tensile testing machine is calculated in substantially the same state as the state of the tensile testing machine when the tensile test is executed. Therefore, the natural frequency of the tensile testing machine can be appropriately calculated.

(Item 3)
In the tensile testing machine described in item 1 or 2, the tensile test is a test which breaks the test target. The machine further includes: a second detection unit that detects convergence of a vibration of the tensile testing machine body caused by breakage of the test target. The timing is included after the tensile testing machine executes the tensile test, and the determination unit determines the timing to be a timing after the second detection unit detects the convergence of the vibration of the tensile testing machine body.

According to the tensile testing machine described in item 3, the timing at which the striking force is applied to the tensile testing machine body is determined to be the timing after the convergence of the vibration of the tensile testing machine body is detected. Thus, the timing at which the striking force is applied to the tensile testing machine body can be determined to be an appropriate timing. That is, the tensile test is a test which breaks the test target. Thus, the tensile testing machine body vibrates when the test target breaks. In this regard, the striking force is applied to the tensile testing machine body after it is detected that the vibration of the tensile testing machine body converges. Thus, the natural frequency can be measured without being affected by the vibration of the tensile testing machine body caused by the breakage of the test target. Therefore, the natural frequency of the tensile testing machine can be appropriately calculated.

(Item 4)

The tensile testing machine described in any one of items 1 to 3 further includes: a force detector that detects the tensile force. The striking structure applies the striking force to the force detector, and when the striking force is applied by the striking structure, the first detection unit detects the vibration of the tensile testing machine body with the force detector.

According to the tensile testing machine described in item 4, the vibration of the tensile testing machine body is detected by the force detector. Thus, the vibration of the tensile testing machine body can be accurately detected. Further, it is not necessary to arrange a detector different from the force detector in order to detect the vibration of the tensile testing machine body. Therefore, the vibration of the tensile testing machine body can be detected with a simple configuration.

(Item 5)

In the tensile testing machine described in item 4, the tensile testing machine body includes a gripper connected to the force detector, and the striking structure applies the striking force to the gripper.

According to the tensile testing machine described in item 5, the striking force is applied to the gripper connected to the force detector. Thus, the natural frequency can be accurately measured.

(Item 6)

A method for controlling a tensile testing machine according to item 6 is a method for controlling a tensile testing machine that executes a tensile test by applying a tensile force to a test target. The tensile testing machine includes a striking structure that applies a striking force to a tensile testing machine body. The method includes: determining a timing at which the striking force is applied to the tensile testing machine body; applying the striking force to the tensile testing machine body by the striking structure at the timing determined in the determining; detecting a vibration of the tensile testing machine generated by the striking force; calculating a natural frequency of the tensile testing machine on the basis of a detection result in the detecting; executing the tensile test; and recording information indicating a test result of the tensile test in association with information indicating the natural frequency. The timing is either before or after the tensile testing machine executes the tensile test.

According to the tensile testing machine described in item 6, the information indicating the test result of the tensile test is recorded in association with the information indicating the natural frequency. Thus, the test result of the tensile test and the measurement result of the natural frequency can be easily associated with each other.

5. Other Embodiments

Incidentally, the above-described embodiment merely exemplifies one aspect of the present invention, and can be arbitrarily modified and applied without departing from the gist of the present invention.

In the embodiments described above, the tensile testing machine is the hydraulic high-speed tensile testing machine 1, but the embodiment of the present invention is not limited thereto. For example, the tensile testing machine may be configured to move a crosshead arranged with the upper gripper along a screw pole driven by the servo motor.

In the embodiments described above, the recording unit 517 writes, in the result storage unit 518, the information indicating the test result of the tensile test in association with the information indicating the natural frequency FA, but the embodiment of the present invention is not limited thereto. For example, the recording unit 517 may write, in a recording medium such as a compact disc (CD) or a digital versatile disc (DVD), the information indicating the test result of the tensile test in association with the information indicating the natural frequency FA. Further, for example, the recording unit 517 may write, in a server device communicably connected to the control unit 51, the information indicating the test result of the tensile test in association with the information indicating the natural frequency FA.

In the embodiments described above, the load cell 14 detects the vibration of the testing machine body 2 generated by the striking force FD, but the embodiment of the present invention is not limited thereto. The tensile testing machine 1 may include a vibration detector different from the load cell 14, and the vibration detector may detect the vibration of the testing machine body 2 generated by the striking force FD. In this case, the vibration detector may be an accelerometer.

In the embodiments described above, the force detector is the load cell 14, but the embodiment of the present invention is not limited thereto. It is sufficient if the impact force applied to the test target is detected by the force detector. The force detector may be an accelerometer.

In the embodiments described above, the striking structure 60 drops the steel ball 61 into the testing machine body 2, but the embodiment of the present invention is not limited thereto. It is sufficient if the striking structure 60 applies the striking force FD to the testing machine body 2. For example, the striking structure 60 may be an impact hammer to apply the striking force FD to the testing machine body 2.

In the embodiments described above, the striking structure 60 applies the striking force FD to the lower gripper 22, but the embodiment of the present invention is not limited thereto. It is sufficient if the striking structure 60 applies the striking force FD to the testing machine body 2. For example, the striking structure 60 may apply the striking force FD to the load cell 14.

In the above-described embodiments, the functional block illustrated in FIG. 2 is a schematic diagram illustrating the components which are classified according to the main processing contents in order to facilitate understanding of the present invention, and the components can be further classified into more components according to the processing contents. Further, one component can be further classified to execute more processes.

In the above-described embodiments, the processing units of the flowcharts illustrated in FIGS. 6, 8, and 10 are divided according to main processing contents in order to facilitate understanding of the processing of the control unit 51. The division method and the names of the processing units illustrated in the flowcharts of FIGS. 6, 8, and 10 are not restrictive, and the processing unit can be divided into more processing units or one processing unit can be divided to include more processes according to the processing contents. Further, the processing order of the above flowcharts is not limited to the illustrated example.

REFERENCE SIGNS LIST

1 HIGH-SPEED TENSILE TESTING MACHINE (TENSILE TESTING MACHINE)
2 TENSILE TESTING MACHINE BODY
14 LOAD CELL (FORCE DETECTOR)
2 TENSILE TESTING MACHINE BODY
21 UPPER GRIPPER
22 LOWER GRIPPER (GRIPPER)
30 CONTROL DEVICE
4 CONTROL UNIT
41 MAIN BODY CONTROL DEVICE
411 TEST CONTROL UNIT
50 PERSONAL COMPUTER
51 CONTROL UNIT
511 RECEPTION UNIT
512 SECOND DETECTION UNIT
513 DETERMINATION UNIT
514 FIRST DETECTION UNIT
515 CALCULATION UNIT
516 EXECUTION INSTRUCTION UNIT (EXECUTION UNIT)
517 RECORDING UNIT
518 RESULT STORAGE UNIT
60 STRIKING STRUCTURE
61 STEEL BALL
62 ARM
63 SUPPORT SHAFT
64 SUPPORT PORTION
65 SCREW
66 ELECTROMAGNET
67 SUPPORT PLATE
68 SUPPORT PORTION
69 SCREW
70 MAGNET STAND
71 SUPPORT COLUMN
72 BASE
B INTENSITY
FA NATURAL FREQUENCY
FD STRIKING FORCE
FR FREQUENCY
F TEST FORCE
SP FREQUENCY SPECTRUM
TP TEST TARGET

The invention claimed is:

1. A tensile testing machine that executes a tensile test by applying a test force to a test target, the tensile testing machine comprising:
a processor,
a memory and a striking structure, wherein
the processor is configured to determine a timing at which a striking force is applied to a tensile testing machine body;
the striking structure has a steel ball or an impact hammer that applies the striking force to the tensile testing machine body at the timing determined by the processor;
the processor is further configured to:
detect a vibration of the tensile testing machine body generated by the striking force;
calculate a natural frequency of the tensile testing machine on a basis of a detection result of the processor;
execute the tensile test; and
record information indicating a test result of the tensile test in association with information indicating the natural frequency,
wherein the timing is either before or after the tensile testing machine executes the tensile test;
wherein the processor is further configured to receive an input from a user giving an instruction on execution of the tensile test,
wherein the timing comes before the tensile testing machine executes the tensile test,
the processor determines the timing at which the striking force is applied to the tensile testing machine body during a time interval between a first time and a second time,
wherein the first time is a time at which a test start button of the tensile testing machine is operated and is a time point at which the input from the user gives the instruction on execution of the tensile test, and the second time is a time at which a natural frequency measurement process of the natural frequency is started, and
the processor executes the tensile test after the processor calculates the natural frequency,
wherein the tensile test is started when an amplitude of the vibration of the tensile testing machine body becomes equal to or less than a predetermined amplitude.

2. The tensile testing machine according to claim 1, wherein
the load cell is a force detector that detects the test force, wherein
the striking structure applies the striking force to the force detector, and
when the striking force is applied by the striking structure, the processor detects the vibration of the tensile testing machine body with the force detector.

3. The tensile testing machine according to claim 2, wherein
the tensile testing machine body includes a gripper connected to the force detector, and
the striking structure applies the striking force to the gripper.

4. A tensile testing machine that executes a tensile test by applying a test force to a test target, the tensile testing machine comprising:
a processor, a load cell, a memory and a striking structure, wherein the processor is configured to determine a timing at which a striking force is applied to a tensile testing machine body;

the striking structure has a steel ball or an impact hammer that applies the striking force to the tensile testing machine body at the timing determined by the processor;

the processor is further configured to:

detect a vibration of the tensile testing machine body generated by the striking force;

calculate a natural frequency of the tensile testing machine on a basis of a detection result of the processor;

execute the tensile test; and record information indicating a test result of the tensile test in association with information indicating the natural frequency, wherein the timing is either before or after the tensile testing machine executes the tensile test;

wherein the tensile test is a test which breaks the test target, the processor is further configured to detect convergence of a vibration of the tensile testing machine body caused by breakage of the test target, wherein the timing comes after the tensile testing machine executes the tensile test, and the processor determines the timing to be a timing in response to the processor detecting the convergence of the vibration of the tensile testing machine body, wherein the memory stores a predetermined amplitude, the processor is configured to:

retrieve the predetermined amplitude, compare an amplitude of the vibration of the test force detected by the load cell with the predetermined amplitude, and perform striking in response to the amplitude of the vibration of the test force becoming equal to or less than the predetermined amplitude.

5. A method for controlling a tensile testing machine that executes a tensile test by applying a tensile force to a test target, wherein the tensile testing machine includes a processor, a memory and a striking structure having a steel ball or an impact hammer that applies a striking force to a tensile testing machine body, the method comprising:

determining a timing at which the striking force is applied to the tensile testing machine body by the processor;

applying the striking force to the tensile testing machine body by the striking structure at the timing determined by the processor in the determining;

detecting a vibration of the tensile testing machine generated by the striking force by the processor;

calculating a natural frequency of the tensile testing machine on a basis of a detection result in the detecting by the processor;

executing the tensile test by the processor; and recording information indicating a test result of the tensile test in association with information indicating the natural frequency by the processor, wherein the timing is either before or after the tensile testing machine executes the tensile test, wherein the processor is further configured to receive an input from a user giving an instruction on execution of the tensile test, wherein the timing comes before the tensile testing machine executes the tensile test, the processor determines the timing at which the striking force is applied to the tensile testing machine body during a time interval between a first time and a second time, wherein the first time is a time at which a test start button of the tensile testing machine is operated and is a time point at which the input from the user gives the instruction on execution of the tensile test, and the second time is a time at which a natural frequency measurement process of the natural frequency is started, and the processor executes the tensile test after the processor calculates the natural frequency, wherein the tensile test is started when an amplitude of the vibration of the tensile testing machine body becomes equal to or less than a predetermined amplitude.

* * * * *